United States Patent
Liu

(10) Patent No.: US 7,634,479 B2
(45) Date of Patent: Dec. 15, 2009

(54) PRE-POPULATING LOCAL URL RATING CACHE

(75) Inventor: Shuosen Robert Liu, San Jose, CA (US)

(73) Assignee: Trend Micro Incorporated, Yoyogi, Shibuya-ku (JP)

( * ) Notice: Subject to any disclaimer, the term of this patent is extended or adjusted under 35 U.S.C. 154(b) by 252 days.

(21) Appl. No.: 11/618,108

(22) Filed: Dec. 29, 2006

(65) Prior Publication Data

US 2008/0163380 A1  Jul. 3, 2008

(51) Int. Cl.
*G06F 17/30* (2006.01)
(52) U.S. Cl. ....................................................... 707/10
(58) Field of Classification Search ........................ None
See application file for complete search history.

(56) References Cited

U.S. PATENT DOCUMENTS

| | | | |
|---|---|---|---|
| 2002/0046203 A1* | 4/2002 | Siegel et al. | 707/1 |
| 2002/0147895 A1* | 10/2002 | Glance et al. | 711/158 |
| 2003/0195884 A1* | 10/2003 | Boyd et al. | 707/7 |
| 2005/0144297 A1* | 6/2005 | Dahlstrom et al. | 709/229 |

\* cited by examiner

*Primary Examiner*—Mohammad Ali
*Assistant Examiner*—Syed H Hasan
(74) *Attorney, Agent, or Firm*—IP Strategy Group, P.C.

(57) ABSTRACT

A method and apparatus for improving the system response time when URL filtering is employed to provide security for web access. The method involves gathering the attributes of the user, and pre-populating a local URL-rating cache with URLs and corresponding ratings associated with analogous attributes from a URL cache database. Thus, the cache hit rate is higher with a pre-populated local URL rating cache, and the system response time is also improved.

20 Claims, 5 Drawing Sheets

PRE-POPULATING LOCAL URL RATING CACHE

BACKGROUND OF THE INVENTION

The proliferation of malicious and/or inappropriate information/contents on the Internet has necessitated individuals and organizations to adopt protection techniques and systems to protect their users. For example, many individuals and organizations (collectively "users" herein) have long employed software and/or hardware to intercept and inhibit unauthorized attempts to access or download malicious and/or inappropriate information/contents ("unwanted contents" herein).

A common approach to detect attempts to access/download unwanted contents is URL filtering. In URL filtering, a rating server receives URLs from a user's client device (such as a browser or some other internet or network accessing device) and provides rating information regarding the URL. The rating information reflects attributes of the website and/or webpage represented by the URL. Any attribute is possible and attributes include, by way of example and without limitation, news, entertainment, adult, comics, sports, highly rated, poorly rated, newly updated, English, Spanish, etc. The received attributes may be subsequently employed to decide, based on some access policy, whether the user is permitted to access the webpage or website associated with the URL.

To facilitate discussion, FIG. 1 shows a simplified block diagram of a typical prior art URL rating scheme. As shown in FIG. 1, a client 102 sends a URL string "abcwidget.com" (104) to a gateway device 106 to request access to a website 108 via the internet 110.

Gateway device 106 is shown implementing URL filtering 112. To decide whether the user associated with client 102 is allowed to access website 108 of abcwidget.com, URL filtering 112 may send a rating request (118) for the user-input URL (i.e., "abcwidget.com") to a URL rating server 114 through the Internet 110. In response, URL rating server 114 sends a rating (120) back to URL filtering 112 to enable URL filtering 112 to perform its filtering function based on some predefined access policy.

If the access policy permits the user of client 102 to access websites and/or web pages having the rating 120, the user can then website 108 (as shown by reference arrow 124. On the other hand, if the access policy does not permit the user of client 102 to access websites and/or web pages having the rating 120, the request to access website 108 is denied.

Given the popularity of Internet usage, if a rating request needs to be serviced by URL rating server 114 each time client 102 wishes to access a webpage, the number of rating requests serviced on a given day may be quite large, necessitating large communication and processing bandwidth on the part of URL rating server 114 (or multiple servers, as may be the case) and/or imposing a large bandwidth load on the network due to the volume of rating requests and rating responses.

In order to reduce the number of rating requests sent through the network and processed by URL rating server 114, gateway device 106 may implement a local URL rating cache 116 for temporarily storing URLs (or their hash values) of previously accessed web pages, along with their corresponding ratings as received from URL rating server 114. Thus, if a web page has been rated once by URL rating server 104, a subsequent access request by client 102 to that same web page would result in a local cache hit, negating the need to send the URL to URL rating server 104 again to obtain a rating.

In the following discussion, the local URL rating cache (herein "the local cache") is assumed to be implemented in a server that is local to the client device. It should be apparent to those skilled in the art, however, that some embodiments of the invention discussed herein also apply to situations wherein the local URL filtering functionality (including obtaining a rating for a URL), and/or the local URL rating cache is implemented in any device that is communicably coupled with the user's client device (such as a router, a gateway device, etc.) or in the user's client device itself.

To further the discussion, as time goes by, the local URL rating cache 116 tends to be filled with URLs (and associated ratings) of websites and web pages that a user has visited. Since most users tend to revisit a limited set of websites over and over, the rate of cache hit tends to be quite high for URL rating requests. Thus, after some time, the URL rating response time is greatly improved since many, if not most, of the URLs entered by the user will be serviced by the URL rating local cache 116 instead of requiring a rating response from the remote URL rating server 114.

However, the improvement in the URL rating response time only comes after the user has visited that webpage at least once before, and the URL rating for that webpage has been performed at least once, which result in the URL rating data for that webpage to be stored in the local URL rating cache. To elaborate, after the URL rating has been performed at least once using the remote URL rating server (such as server 114 in FIG. 1), the URL and the rating response are then cached locally to service any subsequent rating request for the same URL. To put it differently, until the user has entered the URL at least once to trigger the URL rating request, the URL rating local cache 116 does not have URL rating data for that URL. As a consequence, the user typically experiences some performance degradation due to local URL rating cache miss whenever a webpage is visited for the first time and its URL is entered for the first time.

Improving the average system response time to a request to access a web page, even for web pages that the user has not previously visited, is a subject of embodiments of the present invention.

SUMMARY OF INVENTION

The invention relates, in an embodiment, to a method for provisioning a local URL rating cache. The local URL rating cache is configured to serve as a local cache servicing a URL rating request performed in connection with deciding whether a user is permitted to access a website that is associated with a given URL. The method includes ascertaining URL-relevant attributes of the user, wherein the user represents one of a human user and an organization comprising a plurality of human users. The method further includes obtaining from a URL cache database a first set of URLs and a first set of associated ratings that are associated with URLs in the first set of URLs, the first set of URLs and the first set of associated ratings being selected responsive to the URL-relevant attributes and representing URLs found to have been utilized previously by at least one other user having analogous URL-relevant attributes. The method additionally includes pre-populating the local URL rating cache with the first set of URLs and the first set of associated ratings even if the URLs in the first set of URLs have not been requested by the user. The method also includes employing thereafter the first set of URLs and the first set of associated ratings from the local URL rating cache to service at least one web site access request by the user.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
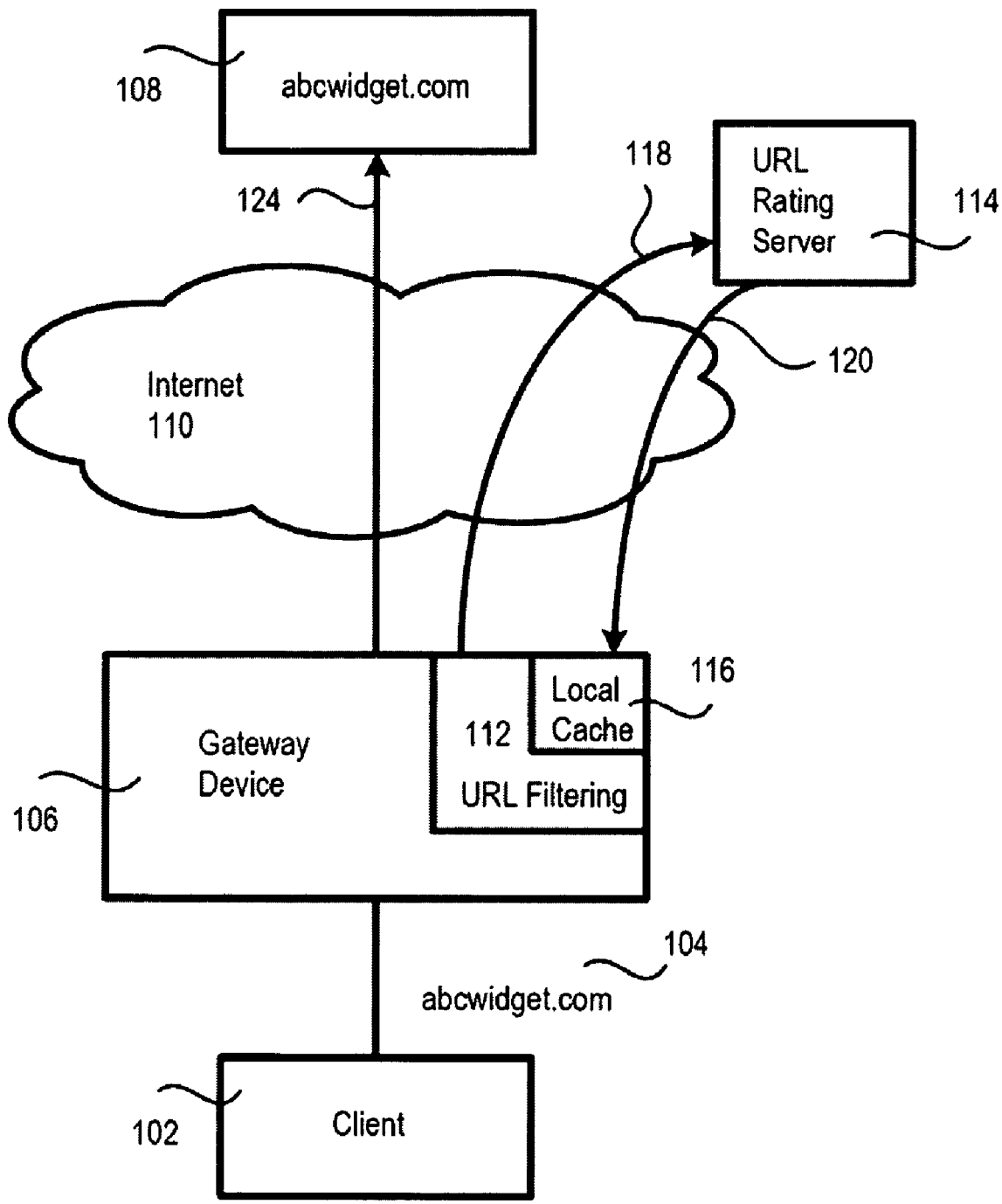
FIG. 1 shows a simplified block diagram of a typical prior art URL rating scheme.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In an embodiment, the invention relates to a technique for pre-populating the local URL rating cache with URLs and corresponding ratings based on attributes (e.g., profile and/or characteristics) of the user. As the term is employed herein, the user can refer to an individual human user if the URL filtering is performed at the individual level for each individual human user. The term "user" can also refer to an organization that employs software and/or hardware to perform URL filtering at the group level for a group of individual users.

When the URL filtering service first initiates for the user (e.g., upon installation of the URL filtering software and/or hardware for the first time), certain URL-relevant attributes about the user may be obtained. As the term is employed herein, URL-relevant attributes refer to attributes of the user that are relevant, directly or indirectly, to the type of URL requests that the user (either individually or collectively as an organization) is likely to make. For example, a typical dentist office will likely access different websites and thus employ different URLs for dentistry-related work when compared to a typical insurance office. As another example, a typical dentist office in San Diego, Calif. may access different websites and thus employ different URLs when compared to a dentist office in New York, N.Y.

The URL-relevant attributes may be obtained from the user directly (e.g., via a questionnaire presented to the user) or by looking up a database if the user's identity is known (e.g., address can be obtained from publicly available search engines, tax records at a municipality can reveal whether a particular user is a homeowner, etc.). For example, some products or services (e.g., security products or security services) may require product registration. Some or all of he URL-relevant attributes may then be collected during this registration process. Generally speaking, any attribute pertaining the user can potentially be a URL-relevant attribute.

These URL-relevant attributes are subsequently provided to a URL cache database, which maintains a database that associates certain URL-relevant attributes with a particular sets of URLs and their corresponding attributes. In some embodiments, the URL cache database may also associate certain users with a particular sets of URLs and their corresponding attributes. The correspondence may be determined empirically or statistically, for example. In an example, the URL requests by a user over time may be analyzed and correlated with attributes of to that user to ascertain the correlation between certain attributes and the URL requests. Subsequently, a user with some or all of the same attributes or attributes deemed to be similar (all the above is referred to herein as "analogous attributes") may have their local URL rating cache pre-populated with those URLs and their corresponding ratings. Attributes can be explicitly specified as analogous to other attributes, or they may be algorithmically or statistically determined as analogous to other attributes based on data pertaining to past history of URL requests among the many users, which data may be stored in the URL cache database or in another database.

For example, an accounting firm from Los Angeles that employs fewer than 10 people and services mostly the retail clients may be deemed to have four URL-relevant attributes: 1) accounting firm, 2) in Los Angeles, 3) having less than 10 employees, and 4) servicing mostly retail clients. When the Los Angeles accounting firm initiates the URL filtering service or brings up a URL filtering device for the first time, these attributes may be collected and employed by the URL cache database to obtain the set of URLs that users having analogous URL-relevant attributes (e.g., accounting firm in big western city having less than 20 employees and servicing retail clients) have requested to access in the past. Note that it is not required that the attributes of the new user matches the attributes of an existing user one-for-one in order for the new user to receive the URL cache data of the existing user. Given a database, the determination of whether there exists a strong correlation between certain attributes and URLs are well within the skills of those familiar with statistical analysis techniques.

Further, note that a user's local URL rating cache may be pre-populated with URLs and corresponding ratings pulled from URL rating data associated with different existing users. That is, URLs and their corresponding ratings may be correlated with attributes from different users instead with a particular existing user, and the URLs and their corresponding ratings furnished to the local URL rating cache of a new user may be a composite set of URLs and corresponding ratings obtained from URL rating data of different users.

In an example, a user having a certain geographic attributes (e.g., a particular town) may have their local URL rating cache pre-populated with URL rating data associated with users having the same geographic attribute. Alternatively or additionally, a user having a certain professional attributes (e.g., a particular profession or type of business) may have their local URL rating cache pre-populated with URL rating data associated with users having the same professional attributes. Alternatively or additionally, a user having a certain hobby attributes (e.g., fishing or tennis, such as provided in a survey or response to a questionnaire) may have their local URL rating cache pre-populated with URL rating data associated with users having the same hobby attributes. The correlation between URL rating data of existing users and attributes may be more complex and may be based on different combinations of attributes. In an embodiment, statistical analysis may be applied in order to ascertain the set of URL rating data most appropriate for a particular new user having a particular combination of attributes.

In an embodiments, different sets of URLs and their associated ratings may be obtained from the URL cache database. Thereafter, the user (or an administrator acting on behalf of the user) may be offered a choice among the different sets of URLs to pre-populate the local URL rating cache. In this case, the user's knowledge regarding his own needs is leveraged to advantage. As an example, a dentist based in New York may be presented with choices of: a) most common URLs for small businesses in New York, b) most common URLs for dentist offices, or c) most common URLs for dentists based in New York. Upon selecting one or more of the choices presented, pre-population may begin.

In an embodiment, certain websites may be deemed to be so universally employed that most or all local URL rating cache would be pre-populated with their URLs and their corresponding ratings. Examples of such URLs may include popular search engines or internet portals or well-known notorious sites.

After pre-population, the local URL rating cache is employed to service requests by the URL filtering service operating on behalf of the new user (e.g., the Los Angeles accounting firm in the above example). If there is a cache miss, a URL rating request is sent to the URL rating server through the network (e.g., the internet) to obtain the rating for the URL for which the local URL rating cache could not service. Once the URL rating server returns the URL along with the rating, the URL and the rating can be cached in the local URL rating cache for future use. If the local URL rating cache fills up, older cached items and/or cached items that are infrequently employed may be discarded to make room as needed.

Furthermore, the URL and the rating associated with the cache miss is updated with a pre-population cache server that is maintained for the purpose of, among others, pre-populating the local URL rating cache of future users. This updating allows the pre-population cache server to accurately keep track of the URLs that are actually requested by the Los Angeles accounting firm or by users having similar attributes. Accordingly, a subsequent user having analogous attributes (e.g., a San Diego accounting firm or a Los Angeles public relations firm) may be have their local URL rating cache pre-populated with more accurate URL rating data, i.e., URL rating data that is likely to result in a higher rate of cache hits for that subsequent user.

During use, the local URL rating cache may continually update itself by pre-fetching at least some of its URL rating data based on URLs that the user actually requests. For example, if the user continually accesses sailing websites, and sailing was not an attribute identified earlier prior to the initial pre-population of the local URL rating cache and/or URL rating data pertaining to sailing websites was not pre-populated into the local URL rating cache initially, the local URL rating cache may, after the initial pre-population, pre-fetch URL rating data pertaining to sailing if it is observed that the user kept accessing sailing-related websites. In this manner, the system response time to handle the user's accessing of sailing-related websites may be substantially improved due to a greater rate of local cache hits.

In an embodiment, the URL rating server may return a URL rating server load hint to the local URL filtering device along with the rating of a URL that has experienced a local cache miss. If the server load hint is below a certain threshold and/or is indicative of a relative light load on the URL rating server, the local URL filtering device may pre-fetch ratings for URLs that it deems the user is likely to request in the near future based on URLs that the user has already requested.

For example, if a user wishes to access the homepage of the website of a popular news network (e.g., xyzpopularnews.com), the URL rating server, upon returning the rating for the URL "xyzpopularnews.com" may also specify its server load level. If the server load is light, the local URL filtering device may pre-fetch ratings for the local news page, the national news page, the sports page, etc. from the website xyzpopularnews.com since the user is deemed to likely access these pages next after accessing the home page of xyzpopularnews.com.

On the other hand, if the server load hint provided by the URL rating server indicates that the URL rating server is heavily loaded, the local URL filtering device may postpone or may not perform pre-fetching altogether until some time has passed or until the URL rating server indicates that its server load is sufficiently light. In this manner, when the URL rating server is busy, the URL rating server is not burdened with having to also provide ratings for URLs that the user has not yet attempted to access. Instead, the busy URL rating server can devote its not-limited resources to rate URLs that are actually requested by users. In this manner, the overall response time for rating URLs is improved.

Figure 2:
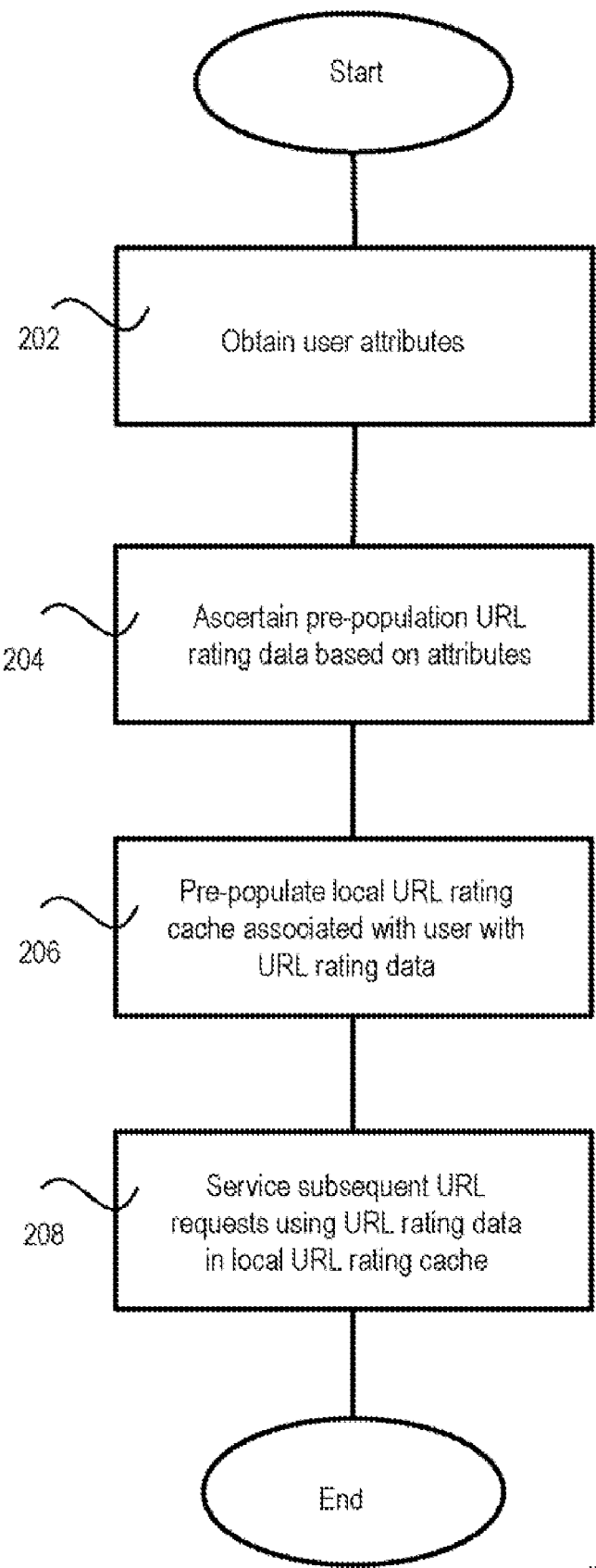
FIG. 2 shows, in accordance with an embodiment of the invention, the steps for pre-populating a local URL rating cache and the subsequent use in servicing URL requests.

The features and advantages of the invention may be better understood with reference to the figures and discussions that follow. FIG. 2 shows, in accordance with an embodiment of the invention, the steps for pre-populating a local URL rating cache and the subsequent use in servicing URL requests. In step 202, the user's attribute data is obtained. As discussed, this attribute data may be obtained explicitly from the user via a registration form, a questionnaire, or a similar method when the URL filtering device or service is activated. Some of the attribute data may be derived from the user's responses, either algorithmically or by consultation with other data sources. For example, the user's home address may be employed to look up the school district information. Yet, some other attribute data may be collected without requiring any user participation. For example, the internet connection employed by the user may furnish information about the user's location.

In step 204, the attributes obtained from the user are then furnished to a pre-population URL rating database to obtain pre-population URL rating data for the local URL rating cache that services this user. In an embodiment, the pre-population URL rating data contains URL requests (and corresponding ratings) already made by existing users. By correlating attributes (individually or in combinations) with URL requests in the pre-population URL rating database, the appropriate pre-population URL rating data (and corresponding ratings) can be obtained for the user based on the furnished attributes.

In step 206, the pre-population URL rating data obtained for the user based on the furnished attributes is cached in the local URL rating cache. Thus, the local URL rating cache for the user now contains URLs and their corresponding ratings. This is so even though the user may not have yet made any request for webpage access.

Subsequently, the pre-population URL rating data in the local URL rating cache is employed to service received URL rating requests from the URL filtering device (step 208).

Figure 3:
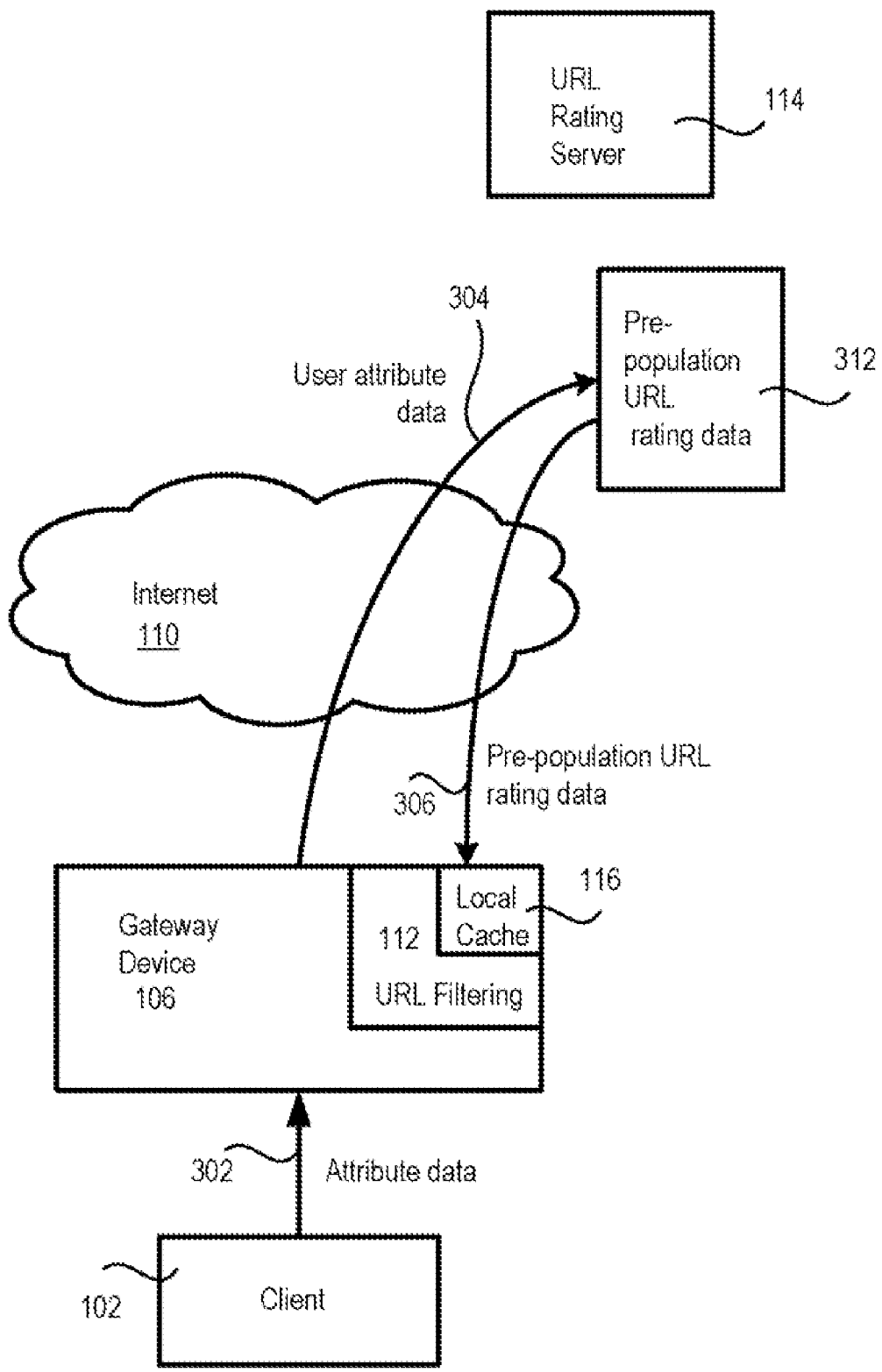
FIG. 3 schematically shows, in accordance with the embodiment of the invention, the pre-populating of local URL rating cache.

FIG. 3 schematically shows, in accordance with an embodiment of the invention, the pre-population of local URL rating cache 116. The attributes for the user are collected (302). The user attributes are then provided (304) to a pre-population URL rating database 312 to select the appropriate pre-population URLs and their corresponding ratings to pre-populate (306) local URL rating cache 116.

Figure 4:
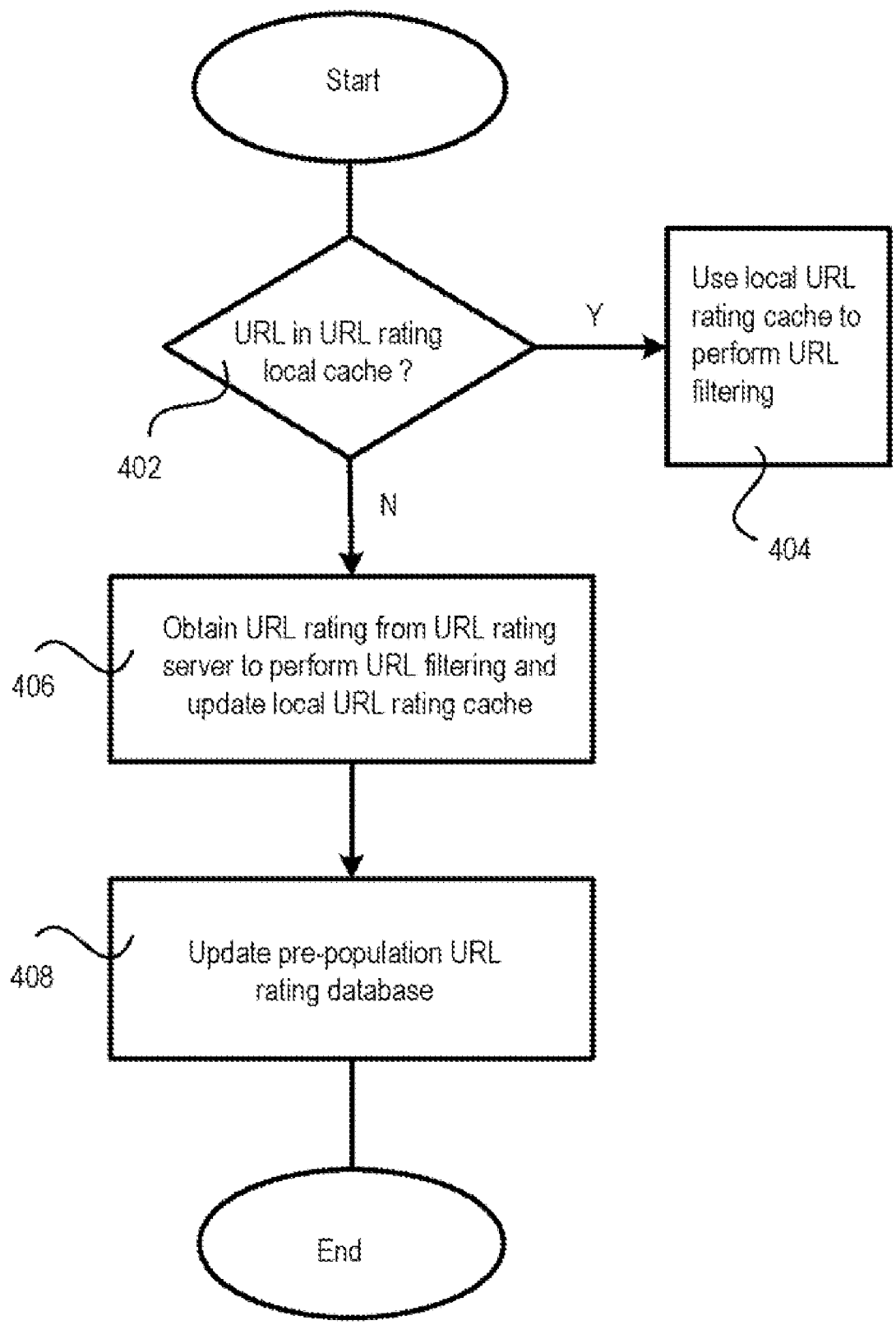
FIG. 4 shows, in accordance with an embodiment of the invention, the steps for servicing a subsequently received URL rating request.

FIG. 4 shows, in accordance with an embodiment of the invention, the steps for servicing a subsequently received URL rating request. The URL rating request may be made by, for example, the URL filtering device or URL filtering logic in response to the user's request to access a certain website. If the URL associated with the user's access request is in the local URL rating cache (as determined by block 402), the local URL rating cache is employed to rate the URL. On the other hand, if the URL associated with the user's access request is not in the local URL rating cache (as determined by block 402), the URL is rated (406) by URL rating server (which may be remote and accessed through the internet). The received rating from the URL rating server is also employed to update the local URL rating cache.

Additionally, the pre-population URL rating database is updated (408) to reflect the URLs (and corresponding ratings) that this particular user and/or users with attributes characteristic of this user are actually accessing. In this manner, the accuracy of pre-population data is improved over time. To further improve accuracy, as with the caches, the rating data in the pre-population URL rating database may be refreshed from time to time to ensure that the ratings stay current.

Figure 5:
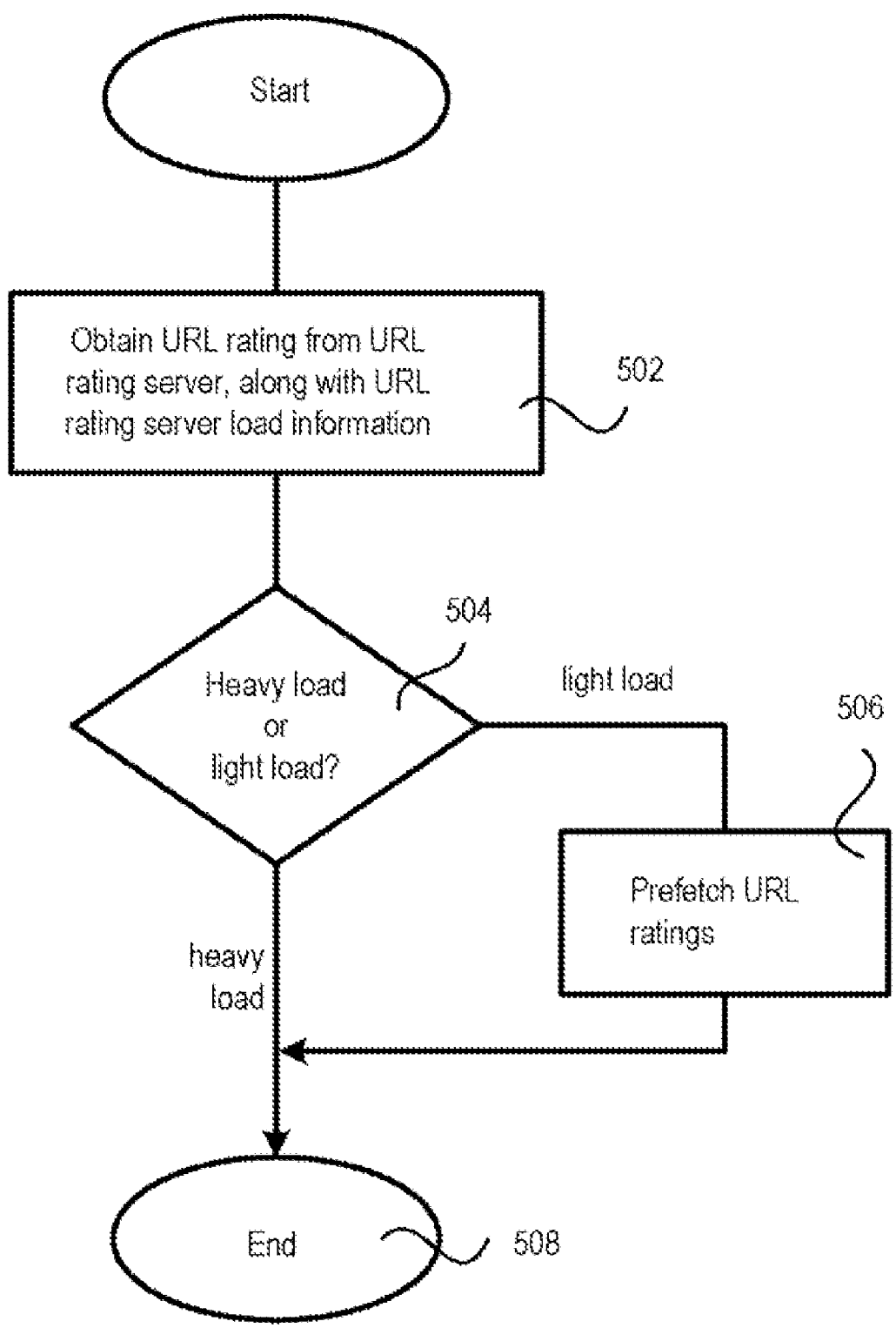
FIG. 5 shows, in accordance with an embodiment of the present invention, the steps for employing URL server load hints in deciding whether to pre-fetch ratings.

FIG. 5 shows, in accordance with an embodiment of the present invention, the steps for employing URL server load hints in deciding whether to pre-fetch ratings. In step 502, the URL rating server (e.g., server 114 in FIG. 3) returns a rating in response to a rating request. Further, the URL rating server may furnish load information indicative of the load on the URL rating server. Alternatively or additionally, the URL rating server may from time to time, irrespective whether in response to a rating request, broadcast server load information.

If the server load information indicates a heavy server load (as ascertained in 504), no pre-fetching is done or pre-fetching may be postponed until a later time. On the other hand, if the server load information indicates a light server load (as ascertained in 504), the URL filter service that operates on behalf of the user may pre-fetch ratings for web pages and/or websites that it expects or believes may be accessed by the user in the near future. Pre-fetching occurs only for URLs that cannot be rated locally by the local URL rating cache, in an embodiment.

As can be appreciated from the foregoing, embodiments of the invention render it possible to achieve a higher rate for local cache hits and thus improve the response to requests to access web pages and/or websites even right from the beginning of the URL filtering service. In other words, even if a new user has never requested access to any web page and thus would not have any URL rating data cached according to the prior art method, embodiments of the invention can still improve the average system response time by pre-populating the local URL rating cache with URL rating data associated with analogous profiles and/or attributes.

Furthermore, by enabling pre-fetching of rating data when the URL rating server is not busy, the average system response time is further improved. Additionally or alternatively, by throttling down the pre-fetching when the URL rating server is experiencing a heavy load, resources of a busy URL rating server is not diverted to satisfy pre-fetching requests but are instead focused on actual pending requests made by users. In this manner, the average system response time is also further improved.

While this invention has been described in terms of several embodiments, there are alterations, permutations, and equivalents, which fall within the scope of this invention. In this disclosure, the term "set" is intended to have its mathematical definition in that a set may have one or more members. It should also be noted that there are many alternative ways of implementing the methods and apparatuses of the present invention. Additionally, it is intended that the abstract section, having a limit to the number of words that can be provided, be furnished for convenience to the reader and not to be construed as limiting of the claims herein. It is therefore intended that the following appended claims be interpreted as including all such alterations, permutations, and equivalents as fall within the true spirit and scope of the present invention.

What is claimed is:

1. A device for provisioning a local URL rating cache, said local URL rating cache being configured to serve as a local cache servicing a URL rating request performed in connection with deciding whether a user is permitted to access a website that is associated with a given URL, said device comprising:

a computer readable medium having computer readable code embodied therein, said computer readable code including:

code for ascertaining URL-relevant attributes of said user, wherein said user represents one of a human user and an organization comprising a plurality of human users, code for determining a plurality of analogous URL-relevant attribute sets based on said URL-relevant attributes of said user, said plurality of analogous URL-relevant attribute sets including at least a first set of analogous URL-relevant attributes and a second set of analogous URL-relevant attributes, code for obtaining from a URL cache database a first plurality of URLs and a first set of associated ratings that are associated with URLs in said first plurality of URLs, said first plurality of URLs representing URLs found to have been utilized previously by at least a first other user having said first set of analogous URL-relevant attributes, code for obtaining from said URL cache database a second plurality of URLs and a second set of associated ratings that are associated with URLs in said second plurality of URLs, said second plurality of URLs representing URLs found to have been utilized previously by at least a second other user having said second set of analogous URL-relevant attributes, code for providing a plurality of choices associated with said plurality of analogous URL-relevant attribute sets to said user for said user to select one or more pluralities of URLs based on one or more sets of analogous URL-relevant attributes associated with one or more of said plurality of choices, each choice of said choices including a plurality of URLs associated with an analogous URL-relevant attribute set, said choices including at least said first plurality of URLs and said second plurality of URLs, code for receiving a selection provided by said user that selects said first plurality of URLs, code for pre-populating said local URL rating cache with said first plurality of URLs and said first set of associated ratings even if said URLs in said first plurality of URLs have not been requested by said user, and code for employing said first plurality of URLs and said first set of associated ratings from said local URL rating cache to service at least one web site access request by said user after said pre-populating; and circuits configured to perform one or more tasks associated with said computer readable code.

2. The device of claim 1 further comprising code for updating said local URL cache database with a first URL and a first rating that is associated with said first URL, said first URL representing a URL requested by said user that results in a cache miss by said local URL rating cache.

3. The device of claim 1 further comprising code for updating said URL cache database with a third set of URLs and a third set of ratings associated with URLs in said third set of URLs, said third set of URLs representing URLs actually requested by said user.

4. The device of claim 1 wherein said user represents said organization.

5. The device of claim 1 wherein said user represents said human user.

6. The device of claim 1 wherein said URL-relevant attributes are obtained from responses by said user.

7. The device of claim 1 wherein said URL-relevant attributes are implicitly obtained.

8. The device of claim 1 further comprising code for pre-populating said local URL rating cache with a predefined set of URLs and corresponding ratings for said predefined set of URLs irrespective of specific attributes of said user.

9. The device of claim 1 further comprising:

code for sending a rating request to a URL rating server, said rating request pertaining to a URL that experienced a cache miss in said local URL rating cache, said URL rating server being remote from said local URL rating cache;

code for receiving a rating for said URL that experienced said cache miss in said local URL rating cache, along with a server load indication, from said URL rating server, said server load indication indicating load on said URL rating server;

code for, if said server load indication is below a heavy load threshold, performing pre-fetching of rating from said URL rating server for at least one other URL, said one other URL representing a URL for a web page that has not yet been requested by said user; and code for, if said server load indication is equal to or above said heavy load threshold, refraining from performing pre-fetching of rating from said URL rating server for said one other URL.

10. A device for performing URL filtering on URLs associated with websites requested by a plurality of human users, said device comprising:

a computer readable medium having computer readable code embodied therein, said computer readable code including:

code for providing a local URL rating cache for an organization, said plurality of human users being part of said organization, said local URL rating cache being configured to serve as a local cache servicing URL rating requests performed in connection with deciding whether individual users of said plurality of human users are permitted to access said websites, code for pre-provisioning said local URL rating cache, code for ascertaining URL-relevant attributes of said organization, code for determining a plurality of analogous URL-relevant attribute sets based on said URL-relevant attributes of said organization, said plurality of analogous URL-relevant attribute sets including at least a first set of analogous URL-relevant attributes and a second set of analogous URL-relevant attributes, code for obtaining from a URL cache database a first plurality of URLs and a first set of associated ratings that are associated with URLs in said first plurality of URLs, said first plurality of URLs representing URLs found to have been utilized previously by at least a first other organization having said first set of analogous URL-relevant attributes, code for obtaining from said URL cache database a second plurality of URLs and a second set of associated ratings that are associated with URLs in said second plurality of URLs, said second plurality of URLs representing URLs found to have been utilized previously by at least a second other user having said second set of analogous URL-relevant attributes, code for providing a plurality of choices associated with said plurality of analogous URL-relevant attribute sets to said organization for said organization to select one or more pluralities of URLs based on one or more sets of analogous URL-relevant attributes associated with one or more of said plurality of choices, each choice of said choices including a plurality of URLs associated with an analogous URL-relevant attribute set, said choices including at least said first plurality of URLs and said second plurality of URLs, code for receiving a selection provided by said organization that selects said first plurality of URLs, code for populating said local URL rating cache with said first plurality of URLs and said first set of associated ratings even if said URLs in said first plurality of URLs have not been requested by said individual users, and code for employing said first plurality of URLs and said first set of associated ratings from said local URL rating cache to service at least one web site access request by one of said plurality of human users after said populating; and circuits configured to perform one or more tasks associated with said computer readable code.

11. The device of claim 10 further comprising code for updating said local URL cache database with a first URL and a first rating that is associated with said first URL, said first URL representing a URL requested by a first user of said plurality of human users that results in a cache miss by said local URL rating cache.

12. The device of claim 10 further comprising code for updating said URL cache database with a third plurality of URLs and a set of ratings associated with URLs in said third plurality of URLs, said third plurality of URLs representing URLs actually requested by a first user of said plurality of human users.

13. The device of claim 10 wherein said URL-relevant attributes are obtained from responses by an administrator of said organization.

14. The device of claim 10 wherein said URL-relevant attributes are implicitly obtained.

15. The device of claim 10 further comprising code for pre-populating said local URL rating cache with a predefined set of URLs and corresponding ratings for said predefined set of URLs irrespective of specific attributes of said organization.

16. The device of claim 10 further comprising:
   code for sending a rating request to a URL rating server, said rating request pertaining to a URL that experienced a cache miss in said local URL rating cache, said URL rating server being remote from said local URL rating cache;
   code for receiving a rating for said URL that experienced said cache miss in said local URL rating cache, along with a server load indication, from said URL rating server, said server load indication indicating load on said URL rating server;
   code for, if said server load indication is below a heavy load threshold, performing pre-fetching of rating from said URL rating server for at least one other URL, said one other URL representing a URL for a web page that has not yet been requested by a first user of said plurality of human users; and
   code for, if said server load indication is equal to or above said heavy load threshold, refraining from performing pre-fetching of rating from said URL rating server for said one other URL.

17. A device for provisioning a local URL rating cache, said local URL rating cache being configured to serve as a local cache servicing a URL rating request performed in connection with deciding whether a user is permitted to access a website that is associated with a given URL, said device comprising:
   a computer readable medium having computer readable code embodied therein, said computer readable code including:
      code for ascertaining URL-relevant attributes of said user, wherein said user represents one of a human user and an organization comprising a plurality of human users,
      code for determining a plurality of analogous URL-relevant attribute sets based on said URL-relevant attributes of said user, said plurality of analogous URL-relevant attribute sets including a plurality sets of analogous URL-relevant attributes,
      code for obtaining from a URL cache database a group of pluralities of URLs and a plurality of sets of associated ratings, each of said plurality of sets of associated ratings corresponding to one of said group of pluralities of URLs, each of said group of pluralities of URLs representing URLs found to have been utilized previously by at least one other user having a set of analogous URL-relevant attributes among said plurality of analogous URL-relevant attribute sets,
      code for presenting a plurality of choices associated with said plurality of analogous URL-relevant attribute sets to said user for said user to select one or more pluralities of URLs based on one or more analogous URL-relevant attribute sets associated with one or more of said plurality of choices, each choice of said choices including a plurality of URLs associated with an analogous URL-relevant attribute set, said choices including at least said group of pluralities of URLs,
      code for receiving a selection provided by said user that selects at least a first plurality of said group of pluralities of URLs,
      code for determining at least a first one of said plurality of sets of associated ratings that are associated with said first plurality of said group of pluralities of URLs,
      code for pre-populating said local URL rating cache with said at least said first plurality of said group of pluralities of URLs and said first one of said plurality of sets of associated ratings even if said first one of said group of pluralities of URLs have not been requested by said user, and
      code for employing said at least said first plurality of said group of pluralities of URLs and said first one of said plurality of sets of associated ratings from said local URL rating cache to service at least one web site access request by said user after said pre-populating; and
   circuits configured to perform one or more tasks associated with said computer readable code.

18. The device of claim 17 further comprising code for updating said local URL cache database with a first URL and a first rating that is associated with said first URL, said first URL representing a URL requested by said user that results in a cache miss by said local URL rating cache.

19. The device of claim 17 further comprising code for updating said URL cache database with a second plurality of URLs and a second set of ratings associated with URLs in said second plurality of URLs, said second plurality of URLs representing URLs actually requested by said user.

20. The device of claim 17 wherein said URL-relevant attributes are obtained from responses by said user.

* * * * *